United States Patent
Jarvenpaa et al.

(10) Patent No.: US 12,366,751 B2
(45) Date of Patent: Jul. 22, 2025

(54) APPARATUS FOR PROJECTING IMAGES TOWARDS A USER

(71) Applicant: Nokia Technologies Oy, Espoo (FI)

(72) Inventors: Toni Johan Jarvenpaa, Akaa (FI); Marja Pauliina Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/243,734

(22) Filed: Sep. 8, 2023

(65) Prior Publication Data
US 2024/0085697 A1    Mar. 14, 2024

(30) Foreign Application Priority Data

Sep. 12, 2022    (EP) ..................... 22194997

(51) Int. Cl.
*G02B 27/01* (2006.01)
*G02B 27/00* (2006.01)

(52) U.S. Cl.
CPC ..... *G02B 27/0101* (2013.01); *G02B 27/0081* (2013.01); *G02B 27/0093* (2013.01); *G02B 27/0179* (2013.01); *G02B 2027/0112* (2013.01); *G02B 2027/0134* (2013.01); *G02B 2027/0187* (2013.01)

(58) Field of Classification Search
CPC ............ G02B 27/0101; G02B 27/0081; G02B 27/0093; G02B 27/0179; G02B 2027/0112; G02B 2027/0134; G02B 2027/0187
See application file for complete search history.

(56) References Cited

U.S. PATENT DOCUMENTS

| | | | |
|---|---|---|---|
| 10,567,744 B1 * | 2/2020 | Giguere | G02B 27/0172 |
| 11,348,252 B1 * | 5/2022 | Moss | G06T 7/194 |
| 12,027,113 B1 * | 7/2024 | Broggi | G06F 3/1423 |
| 2007/0009222 A1 * | 1/2007 | Koo | H04N 13/395 348/E13.057 |
| 2009/0122134 A1 * | 5/2009 | Joung | H04N 9/8205 348/E13.001 |
| 2010/0161686 A1 * | 6/2010 | Yun | H04N 13/161 707/812 |
| 2010/0328306 A1 * | 12/2010 | Chau | G06F 3/0418 345/173 |
| 2011/0175902 A1 * | 7/2011 | Mahowald | H04N 13/395 345/419 |
| 2014/0064655 A1 | 3/2014 | Nguyen et al. | |
| 2017/0330368 A1 * | 11/2017 | Bell | G06T 11/60 |
| 2019/0049899 A1 * | 2/2019 | Gelman | G03H 1/2205 |
| 2022/0187601 A1 * | 6/2022 | Morozov | G09G 3/003 |

* cited by examiner

*Primary Examiner* — Ariel A Balaoing
(74) *Attorney, Agent, or Firm* — McCarter & English, LLP

(57) ABSTRACT

An apparatus including a first display means projecting light in a first band of wavelengths to form a first image at a first eye of a user and for projecting light in the first band of wavelengths to form a second image at a second eye of the user; a second display for projecting light in a second band of wavelengths to form a third image at the first eye of the user and at the second eye of the user, wherein the first band of wavelengths and the second band of wavelengths are different.

15 Claims, 9 Drawing Sheets

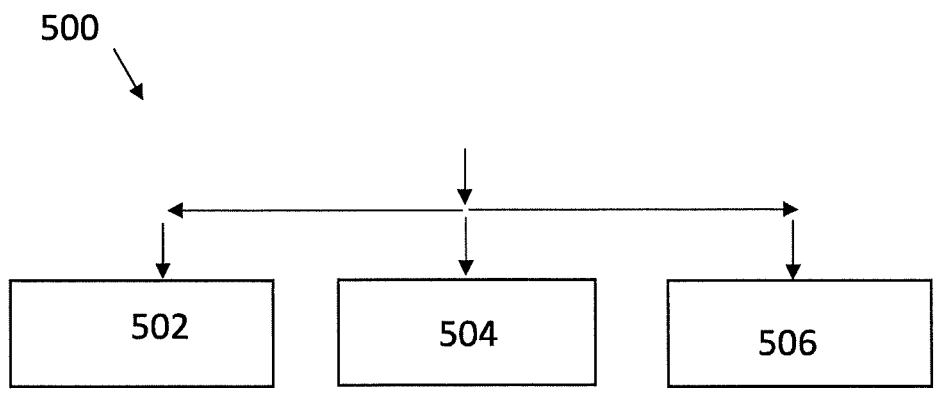
FIG 15
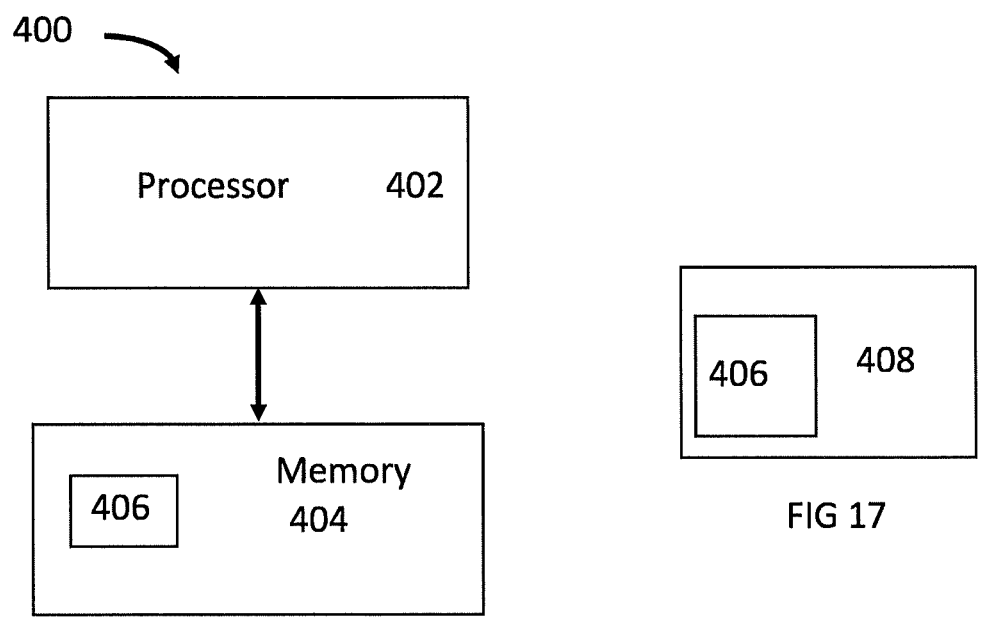
FIG 16
FIG 17

APPARATUS FOR PROJECTING IMAGES TOWARDS A USER

TECHNOLOGICAL FIELD

Embodiments of the present disclosure relate to an apparatus such as a light guide display that can be used to project images towards a user.

BACKGROUND

A light guide display can be used to project images towards a user. These are attractive because they can have a large exit pupil and therefore do not require exact positioning of a viewing user. However, a light guide display is often optimized for use in a narrow band of wavelengths. Multiple light guides, each with a narrow color gamut, can be used together to provide a larger color gamut. However, this can be expensive and also add weight and volume.

BRIEF SUMMARY

According to various, but not necessarily all, examples there is provided an apparatus comprising:
  a first display means for projecting light in a first band of wavelengths to form a first image at a first eye of a user and for projecting light in the first band of wavelengths to form a second image at a second eye of the user;
  a second display means for projecting light in a second band of wavelengths to form a third image at the first eye of the user and at the second eye of the user,
  wherein the first band of wavelengths and the second band of wavelengths are different.

In some but not necessarily all examples, the first display means and the second display means are configured to superpose the first image and the third image, in register, at the first eye of the user and to superpose the second image and the third image, in register, at the second eye of the user.

In some but not necessarily all examples, the first display means and the second display means are configured to superpose the first image and the third image, in register, at the first eye of the user to create a fourth image at the first eye and to superpose the second image and the third image, in register, at the second eye of the user to create the fourth image at the second eye.

In some but not necessarily all examples the apparatus comprises:
  means for obtaining a user position; and
  means for adjusting, in dependence upon the user position, at least one of the first image, second image and third image to superimpose, in register, the first image and the third image at the first eye of the user and the second image and the third image at the second eye of the user.

In some but not necessarily all examples, the means for adjusting is configured to adjust, in dependence upon the user position, at least one of the first image, second image and third image to superimpose, in register, the first image and the third image at the first eye of the user and the second image and the third image at the second eye of the user to create a fourth image at the first eye and at the second eye.

In some but not necessarily all examples, the means for adjusting is configured to adjust, in dependence upon the user position, at least one of the first image, second image and third image by performing one or more of: a relative lateral shift, a rescale.

In some but not necessarily all examples the apparatus comprises: means for determining a user position, optionally for determining user eye positions or eye pupil positions.

In some but not necessarily all examples, the first display means is configured for simultaneous projection of light in a first band of wavelengths to form the first image at the first eye of a user and of light in the first band of wavelengths to form the second image at the second eye of the user.

In some but not necessarily all examples, the second display means comprises one or more exit pupil expanders.

In some but not necessarily all examples the apparatus comprises: display adjustment means for adjusting a projection direction of the first display means and/or the second display means.

In some but not necessarily all examples, the first display means and the second display means are stacked, optionally stacked such that the first display means is further from the user than the second display means.

In some but not necessarily all examples, the first display means and the second display means are configured such that the first wavelength band and the second band are non-overlapping, and optionally the first band of wavelengths is a lower wavelength than the second band of wavelengths.

In some but not necessarily all examples the apparatus is configured as an exit pupil expander (EPE) head up display, optionally a vehicle head up display.

In some but not necessarily all examples the apparatus comprises as the first display means a portable handheld device comprising a color display screen and a binocular display means configured to project light from the color display screen to form a first image at the first eye of the user and to project light from the color display to form a second image at the second eye of the user.

According to various, but not necessarily all, examples there is provided a method comprising:
  projecting light in a first band of wavelengths to form a first image at a first eye of a user;
  projecting light in the first band of wavelengths to form a second image at a second eye of the user;
  projecting light in a second band of wavelengths to form a third image at the first eye of the user and at the second eye of the user,
  wherein the first band of wavelengths and the second band of wavelengths are different.

According to various, but not necessarily all, examples there is provided an apparatus comprising:
  a first display;
  a second display;
  a controller or controllers configured to control the first display to display a reference image composed of a color or colors within a first band of wavelengths and configured to control the second display to display a reference image comprising a color or colors within a second band of wavelengths, wherein the first band of wavelengths and the second band of wavelengths are different;
  a first optical arrangement configured to project light in the first band of wavelengths emitted by the first display to form a first reference image at a first eye of a user and to project light in the first band of wavelengths emitted by the first display to form a second reference image at a second eye of the user; and
  a diffractive lightguide configured to project light in a second band of wavelengths emitted by the second display to form a third image at the first eye of the user and at the second eye of the user According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa.

Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which:

FIG. 15 shows another example of the subject matter described herein;

FIG. 16 shows another example of the subject matter described herein;

FIG. 17 shows another example of the subject matter described herein.

Figure 1:
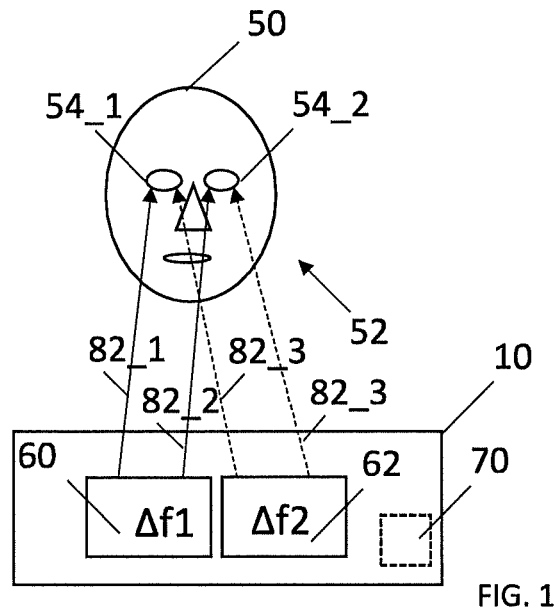
FIG. 1 shows an example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the following description a class (or set) can be referenced using a reference number without a subscript index (e.g., $10$) and a specific instance of the class (member of the set) can be referenced using the reference number with a numerical type subscript index (e.g., $10\_1$) and a non-specific instance of the class (member of the set) can be referenced using the reference number with a variable type subscript index (e.g., $10\_i$).

DETAILED DESCRIPTION

The following FIGs. illustrate examples of an apparatus 10 for projecting images 20 towards a user 50.

Figure 2:
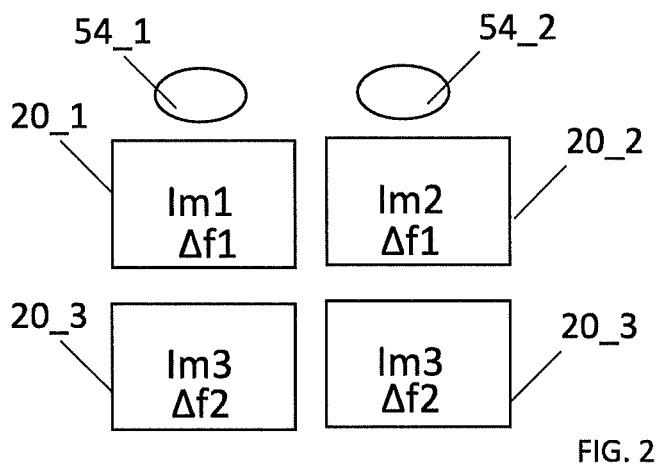
FIG. 2 shows another example of the subject matter described herein.
Figure 3:
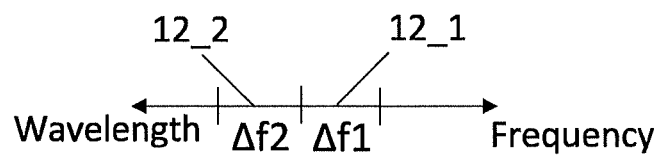
FIG. 3 shows another example of the subject matter described herein.

Referring to FIGS. 1, 2 and 3, an example of the apparatus 10 comprises a first display means 60 for projecting light $82\_1$ in a first band $12\_1$ of wavelengths to form a first image $20\_1$ at a first eye $54\_1$ of a user 50 and for projecting light $82\_2$ in the first band $12\_1$ of wavelengths to form a second image $20\_2$ at a second eye $54\_2$ of the user 50.

The apparatus comprises a second display 62 means for projecting light $82\_3$ in a second band $12\_2$ of wavelengths to form a third image $20\_3$ at the first eye $54\_1$ of the user 50 and at the second eye $54\_2$ of the user 50.

As illustrated in FIG. 3, the first band $12\_1$ of wavelengths and the second band $12\_2$ of wavelengths is different.

In some examples, the first band $12\_1$ of wavelengths is a first contiguous band of one or more wavelengths and the second band $12\_2$ of wavelengths is a second contiguous band of one or more wavelengths. In the following examples, but not necessarily all examples, the first band $12\_1$ of wavelengths and the second band $12\_2$ of wavelengths is distinct and separate. A wavelength within the first band $12\_1$ is not also within the second band $12\_2$. The first band $12\_1$ and the second band $12\_2$ can be contiguous, that is adjacent. Alternatively, the first band $12\_1$ and the second band $12\_2$ can be distinct and separated by another band of wavelengths. Alternatively, the first band $12\_1$ and the second band $12\_2$ can partially overlap with each other. For example, a green light emitting diode (LED) can, in some examples, have a small peak in the blue region (e.g. around 460 nm).

In at least some examples, the first image $20\_1$ is a version of a reference image colored (only) in the first band $12\_1$ of wavelength and the second image $20\_2$ is a version of the reference image colored (only) in the first band $12\_1$ of wavelength, and the third image $20\_3$ is a version of the reference image colored (only) in the second band $12\_2$ of wavelength. For example, the first image $20\_1$ and the second image $20\_2$ could comprise (exclusively) blue pixels of the reference image (not red and green pixels) and the third image $20\_3$ could comprise (exclusively) red and green pixels of the reference image (not blue pixels). The combination of the first image $20\_1$ and the third image $20\_3$ at the first eye $54\_1$ of the user 50 recreates a version of the reference image, the fourth image $20\_4$. The combination of the second image $20\_2$ and the third image at $20\_3$ at the second eye $54\_2$ of the user 50 recreates a version of the reference image, the fourth image $20\_4$.

It will therefore be appreciated that in at least some examples the first and second images $20\_1$, $20\_2$ have the same limited first color gamut and the third image $20\_3$ has a limited second color gamut, but the combination of the first and second color gamuts extends the color gamut and can, for example, create a full color gamut.

The first band $12\_1$ could for example be in the region of 460 nm. The second band $12\_2$ could for example be in the region of 530-630 nm.

Figure 4A:
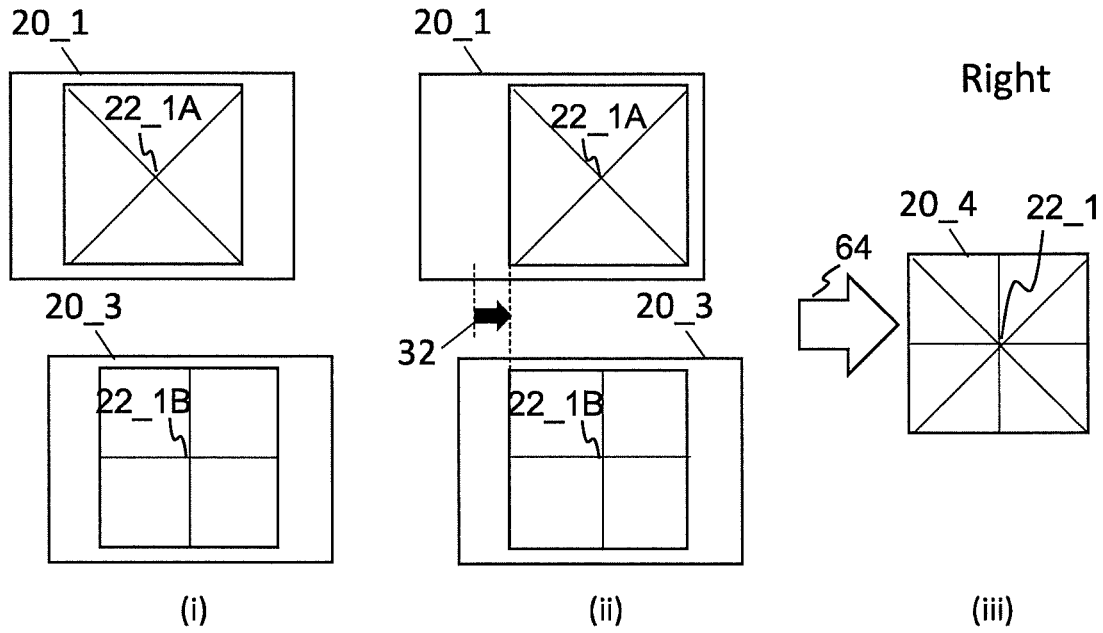
FIG. 4A shows another example of the subject matter described herein.
Figure 4B:
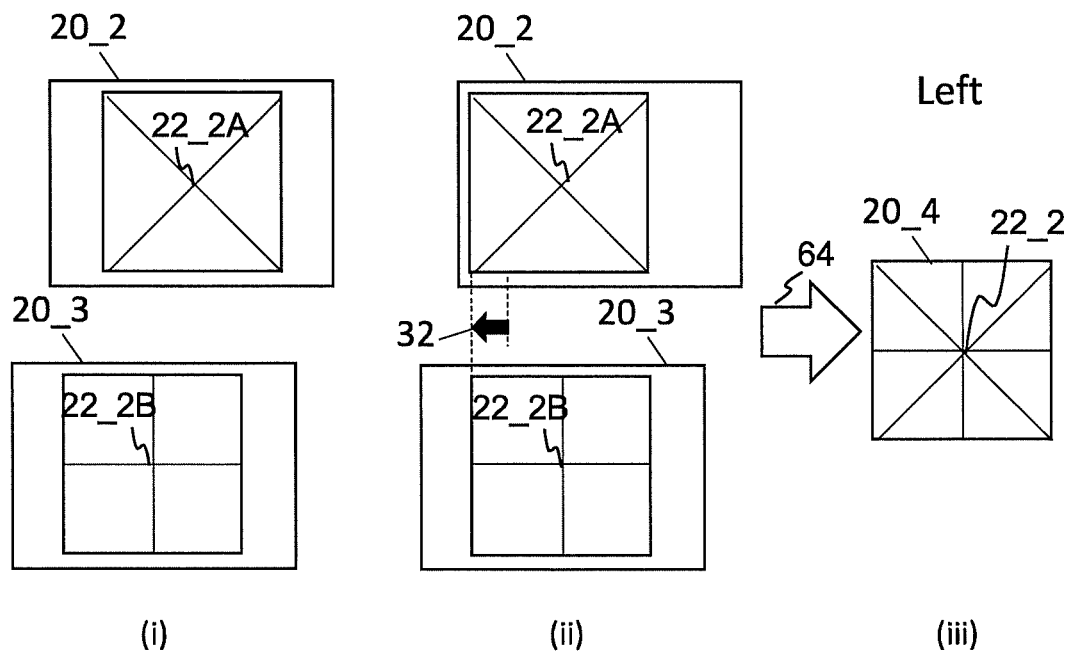
FIG. 4B shows another example of the subject matter described herein.

As illustrated in FIG. 4A and FIG. 4B, the first display 60 means and the second display 62 means are configured to superpose 64 the first image 20_1 and the third image 20_3, in register, at the first eye 54_1 of the user 50 and to superpose the second image 20_2 and the third image 20_3, in register, at the second eye 54_2 of the user 50. Register is feature matching of the overlayed references image.

The superposition of the first image 20_1 and the third image 20_3, in register, at the first eye 54_1 of the user 50 can be used to create an image (a fourth image 20_4) at the first eye 54_1 that is the same as an image created at the second eye 54_2 by the superposition of the second image 20_2 and the third image 20_3, in register, at the second eye 54_2 of the user 50. There are therefore distinct but the same images for left and right eyes.

In some examples, the first image 20_1 is a color-filtered version of a reference image that will be recreated as the fourth image 20_4 at the first eye, the second image 20_2 is a color-filtered version of the reference image that will be recreated as the fourth image 20_4 at the second eye and the third image 20_3 is a color-filtered version of the reference image that will be recreated as the fourth image 20_4 at the first eye and the second eye.

The color filter used to create the first image 20_1 from the reference image can, for example, be a Blue (B) transmission filter. The first image 20_1 comprises blue (B) but does not comprise red (R) and green (G). The color filter used to create the third image 20_3 from the reference image can, for example, be a Red (R) and Green (YG) transmission filter. The third image 20_3 comprises red and green colors but does not comprise blue colors. The superposition (in register) of the Blue first image 20_1 and the Reg-Green third image 20_3 recreates a RGB fourth image 20_4 that substantially corresponds to the first reference image.

The color filter used to create the second image 20_2 from the reference image can, for example, be a Blue (B)®transmission filter. The second image 20_2 comprises blue but does not comprise red (R) and green (G) colors. The superposition (in register) of the Blue second image 20_2 and the Red-Green third image 20_3 recreates a RGB fourth image 20_4 that substantially corresponds to the reference image. The color filters can be applied in the analog or digital domain.

In some examples, the first display 60 means incorporates only a Blue (B) light source such as blue emitting LEDs, and the second display 62 means incorporates only Red (R) and Green (G) light sources such as red and green emitting LEDs. In such examples, color transmission filters for creating the first band 12_1 and the second band 12_2 of wavelengths may not be required.

The fourth image 20_4 is the same image in each eye. There is no stereoscopy.

FIGS. 4A and 4B illustrate a relative lateral shift 32 of both the first image 20_1 and the second image 20_2 by the same amount and in the same direction with respect to the third image 20_3.

In this example the lateral shift is one dimensional.

FIG. 4A(i) illustrates the first image 20_1 and the third image 20_3. They are not in register. FIG. 4A(ii) illustrates the first image 20_1 and the third image 20_3 after a lateral one-dimensional shift 32. They are in register. FIG. 4A(iii) illustrates, after superposition 64, the superposition of the, in register, first image 20_1 and third image 20_3

FIG. 4B(i) illustrates the second image 20_2 and the third image 20_3. They are not in register. FIG. 4B(ii) illustrates the second image 20_2 and the third image 20_3 after the same lateral one-dimensional shift 32. They are in register.

FIG. 4B(iii) illustrates, after the supposition 64, the superposition of the, in register, second image 20_2 and third image 20_3.

In the example illustrated in FIG. 4A, the combination of features 22_1 in the composite image 20_4 is formed from sub-combination 22_1A from the first image 20_1 and sub-combination 22_1B from the third image 64, the 20_3.

The sub-combination 22_1A is shifted 32 relative to the sub-combination 22_1B.

In the example illustrated in FIG. 4B, the combination of features 22_2 in the composite image 20_4 is formed from sub-combination 22_2A from the second image 20_2 and sub-combination 22_2B from the third image relatives 20_3.

The sub-combination 22_2A is shifted 32 relative to the sub-combination 22_2B.

Figure 5:
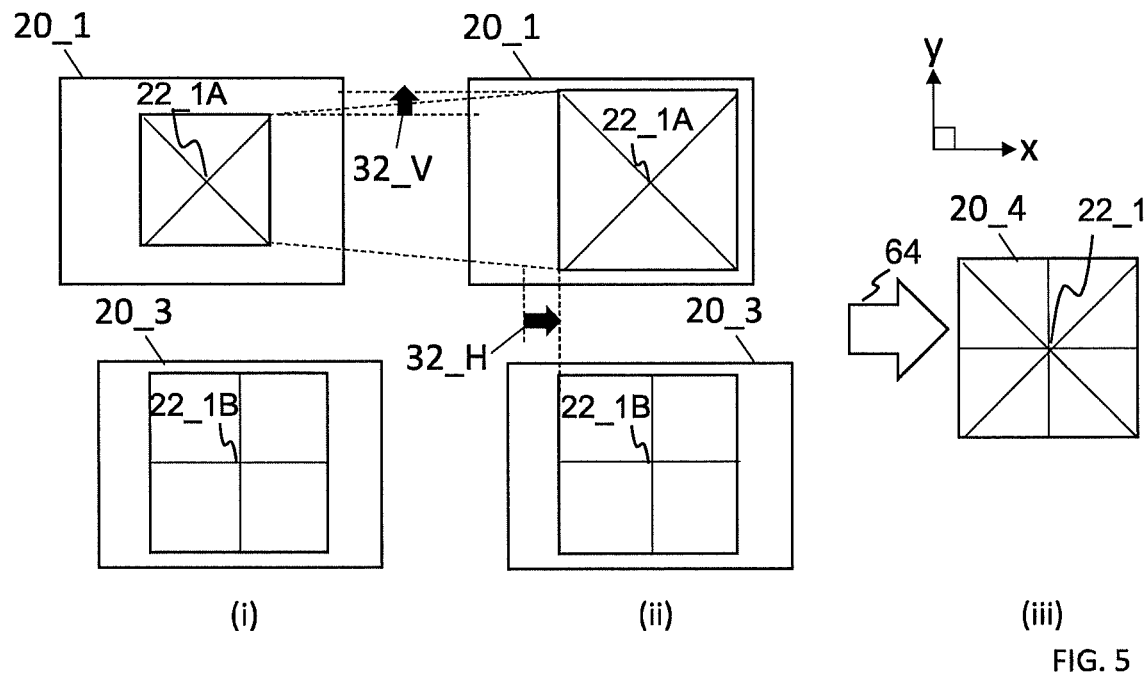
FIG. 5 shows another example of the subject matter described herein.

FIG. 5 illustrates a relative lateral shift and rescaling of the first image 20_1 with respect to the third image 20_3. In this example the lateral shift is two dimensional and the re-scaling is a zoom. For economy of explanation, only the shift and re-scaling of the first image 20_1 is illustrated—this is equivalent to FIG. 4A and can easily be extended to provide an example equivalent to FIG. 4B.

FIG. 5(i) illustrates the first image 20_1 and the third image 20_3. They are not in register. FIG. 5A(ii) illustrates the first image 20_1 and the third image 20_3 after a two-dimensional shift 32 and re-scale. The two-dimensional shift has a horizontal component 32_H and a vertical component 32_V. They are in register. FIG. 5(iii) illustrates the superposition of the, in register, first image 20_1 and third image 20_3.

If (x1, y1), (x2, y2) are the corners of a rectangle in the first image 20_1. There can be a lateral shift in the x-axis direction and/or the y-axis direction ($\Delta x$, $\Delta y$). If (X1, Y1), (X2, Y2) are the corners of an equivalent rectangle in the third image 20_3. There can be a lateral shift in the x-axis direction and/or the y-axis direction ($\Delta X$, $\Delta Y$). There is a first mapping between (x1, y1) and (X1, Y1) e.g., $x1=X1+a$, $y1=Y1+b$ where a, b are lateral shifts in the x/y, X/Y plane. There is a second mapping between ($\Delta x$, $\Delta y$) and ($\Delta X$, $\Delta Y$) e.g., $\Delta x=c*\Delta X$, $\Delta y=d*\Delta Y$ that is 1D or 2D scaling in x/y, X/Y plane.

This analysis can be repeated for the second image 20_2 and the third image 20_3.

The target for the adjustment of shift, is to have the common feature(s) 22_1 that are shared between the first image 20_1 and the third image 20_3 aligned (from the visual perspective of the user 50) in the composite image 20_4 and to have the common feature(s) 22_2 that are shared between the second image 20_2 and the third image 20_3 aligned (from the visual perspective of the user 50) in the composite image 20_4.

Figure 6:
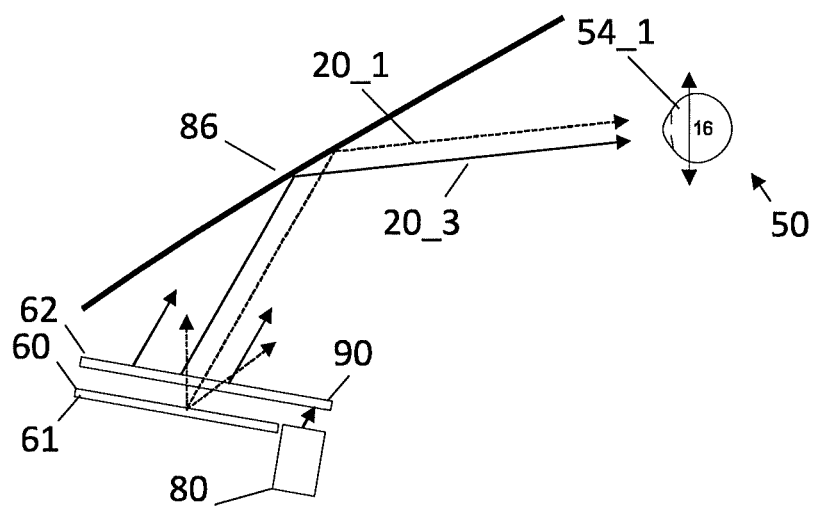
FIG. 6 shows another example of the subject matter described herein.
Figure 10:
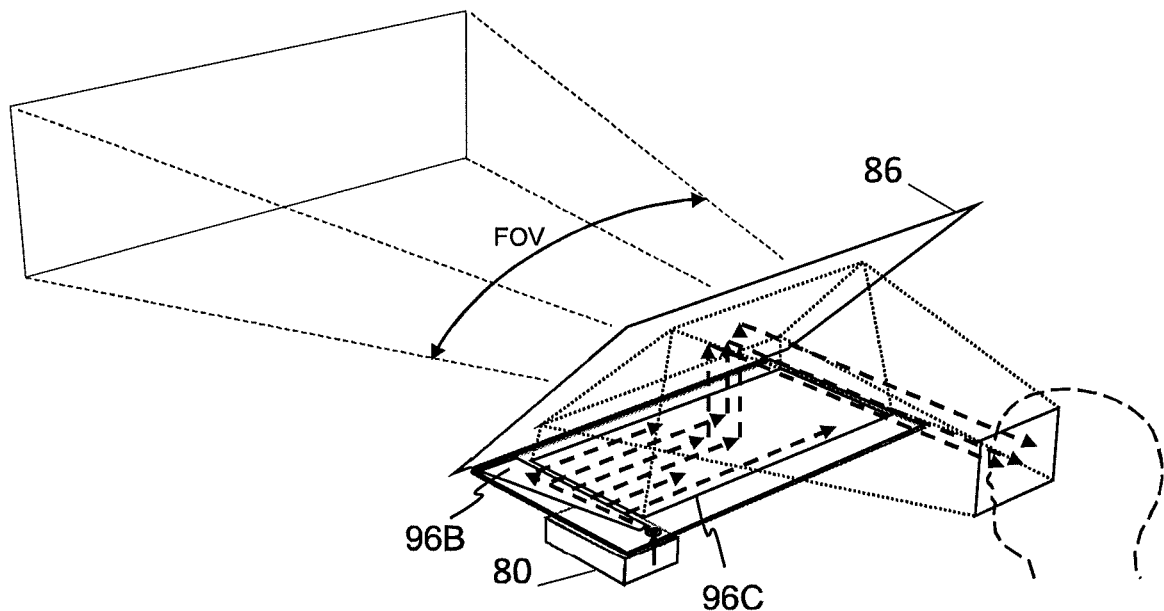
FIG. 10 shows another example of the subject matter described herein.

FIG. 6 illustrates an example of an apparatus 10 from a side view. FIG. 10 illustrates an example of that apparatus 10 from a perspective view.

In this example, but not necessarily all examples, the apparatus 10 comprises, in a stacked arrangement, the first display means 60 which provides the first image 20_1 and the second image 20_2 to respective first and second eyes 54_1, 54_2 and the second display means 62 which provides the third image 20_3 to both the first and second eyes 54_1, 54_2.

In the illustrated example, the first display means 60 and the second display 62 means share a common optical aperture to the user 50 The first display 60 means is configured for simultaneous projection of light in a first band 12_1 of wavelengths to form the first image 20_1 at the first eye 54_1 of a user 50 and of light in the first band 12_1 of wavelengths to form the second image 20_2 at the second eye 54_2 of the user 50.

In this example, but not necessarily all examples, the first display means 60 is a binocular display 61 which is configured to produce two offset images 20_1, 20_2.

In this example, but not necessarily all examples, the second display means 62 is a light guide display comprising one or more light guides 90, which provide the same image 20_3 simultaneously to both the first and second eyes 54_1, 54_2.

The combination of the first image 20_1 from the binocular display 61 and of the third image 20_3 from the light guide 90 forms, at the first eye 54_1 of the user 50, the fourth image 20_4.

The combination of the second image 20_2 from the binocular display 61 and of the third image 20_3 from the light guide 90 forms, at the second eye 54_2 of the user 50, the fourth image 20_4.

A binocular display can comprise a parallax barrier or a lenticular lens sheet for directing light from certain pixels or subpixels to certain views i.e., viewing diamonds. When the eyes are correctly aligned with these views, different images can be observed with each eye. Typically, such displays have been used to render stereoscopic images, where slight perspective differences between the images/views create binocular disparity and therefore a strong sense of 3D for the viewer.

A parallax barrier is a device placed in front of an image source, such as a liquid crystal display, to allow it to show a binocular or multiocular image The binocular display 61 has been attached below the light guide display 62. Display light emitted from the binocular display 61 travels through the light guide 90 of the light guide display 62, reflects from the windshield 86 (optional), and is directed towards the eyes 54_1, 54_2.

The virtual image 20_3 from light guide 90 and binocular images 20_1, 20_2 from the binocular display are superimposed and can be observed as an overlaid/combined image.

The distorting effect of a curved windshield can for example be compensated for by adapting the form of the diffraction gratings or of the light guide, or by using separate optical components stacked with the light guide.

The PGU 80 operates as a projector and projects an image 20_3 into the light guide 90. The light guide 90, in this example, provides the received image 20_3 to a user via the light reflector 86. At least one light reflector 86 is configured to reflect the image provided to it to the user 50.

The light guide is optimized for a certain narrow wavelength band (e.g., 500-650 nm=green+red=yellow) and the binocular display produces a different wavelength band (e.g., 440-480 nm=blue). The superimposed images can be observed as one full RGB image.

It is likely better to produce the shorter bluish wavelengths with the binocular display, as the human eye visual response to these is less accurate compared to the longer wavelengths, and thus the overlay does not need to be absolutely perfect. Other combinations for the wavelength distributions are naturally possible.

Figure 7:
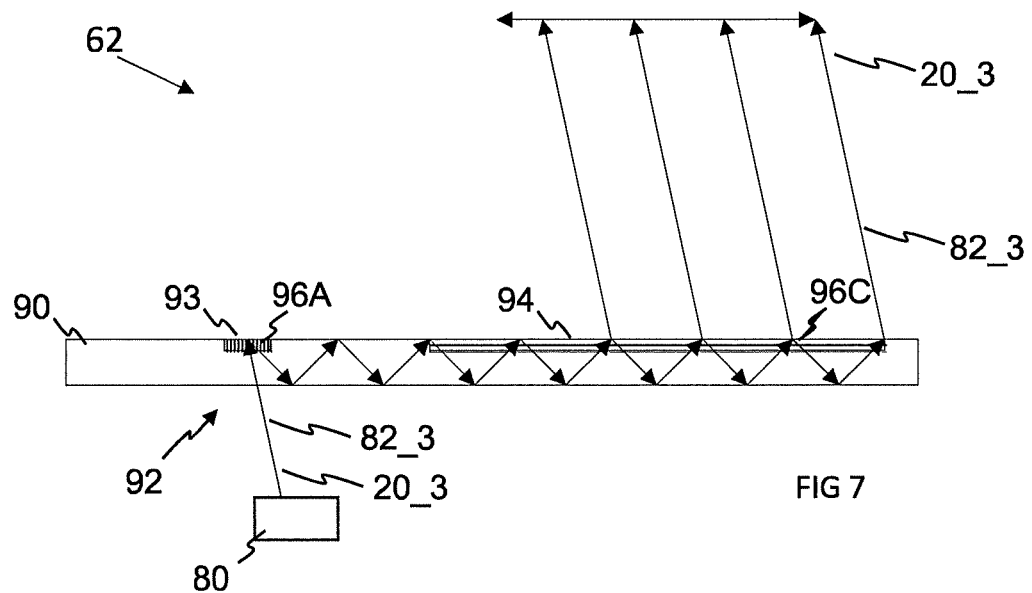
FIG. 7 shows another example of the subject matter described herein.

FIG. 7 illustrates an example of a light guide display comprising a light guide 90. The light guide 90 in this example, but not necessarily all examples, comprises in-coupling diffractive means 93 for receiving input light defining the image 20_3 and out-coupling diffractive means 94 configured to out-couple light 82_3 defining the image 20_3.

In some examples, a diffraction element 96A is used to provide the in-coupling diffractive means 93 and a diffraction element 96C is used to provide the out-coupling diffractive means 94.

The light guide 90 can be configured as an exit pupil expander 92 with an increased number of acceptable viewing positions for a user (not illustrated).

Figure 8:
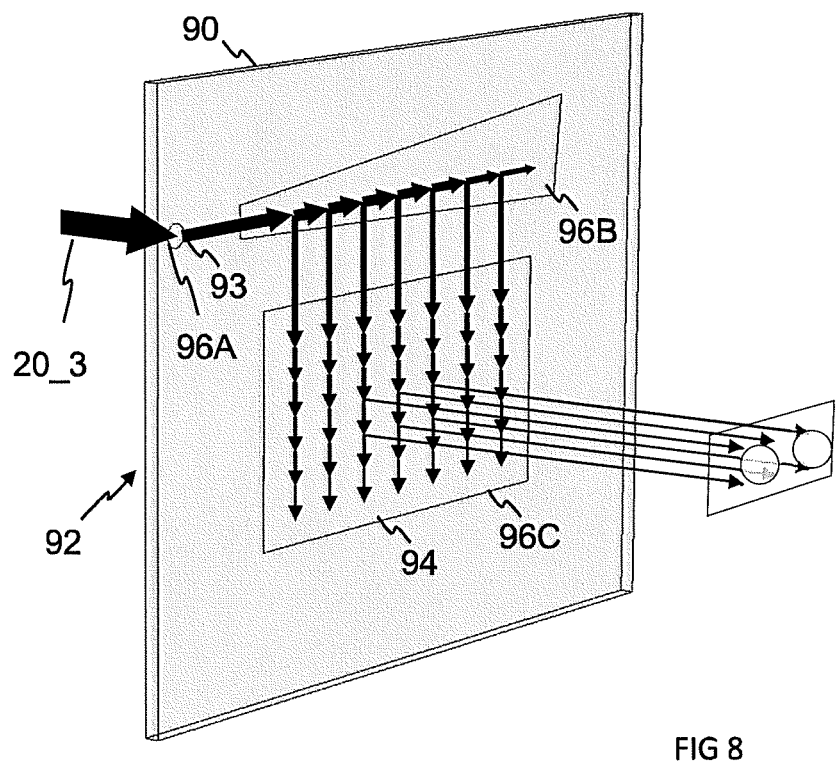
FIG. 8 shows another example of the subject matter described herein.
Figure 9:
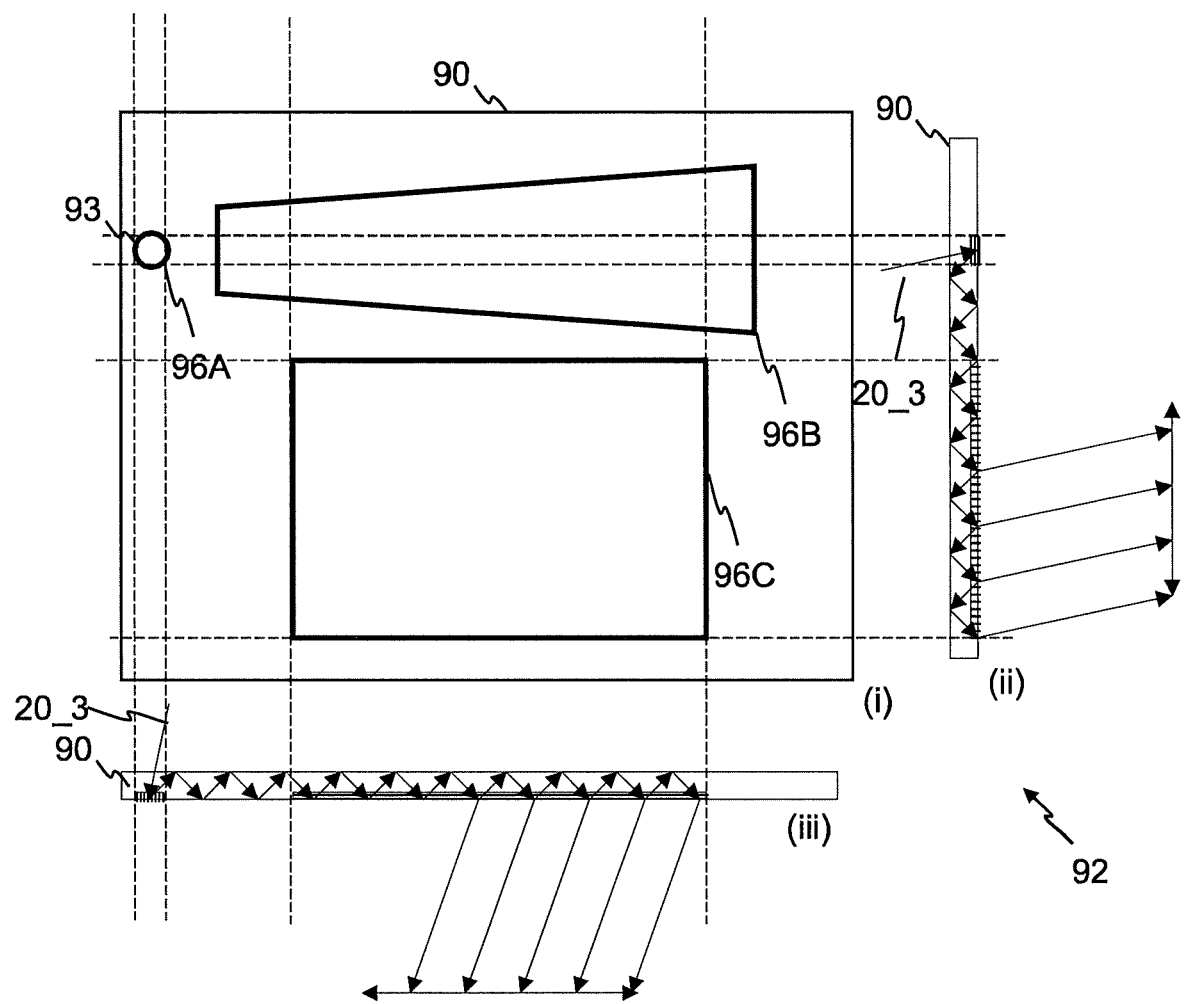
FIG. 9 shows another example of the subject matter described herein.

An example of a two-dimensional exit pupil expander is illustrated in FIG. 8 (and FIG. 9). FIG. 8 is a perspective view. FIG. 9 comprises three distinct views: (i) a top plan view, (ii) a first side view that defines a first dimension and (iii) a second side view that defines a second dimension.

The exit pupil expander 92 comprises in-coupling diffractive means 93 configured to in-couple one or more input beams of light into the light guide 90, expanding means 96B configured to expand the one or more input beams of light, and out-coupling diffractive means 94 configured to out-couple the one or more expanded beams of light from the light guide 90. A diffraction element 96A provides the in-coupling diffractive means 93 and a diffraction element 96C provides the out-coupling diffractive means 94. The expanding means can, in at least some examples, be a diffraction element.

Examples of diffraction elements include but are not limited to diffraction gratings and other periodic structures.

A pupil is a virtual aperture. The input pupil is expanded (increased, multiplied) to form the larger exit pupil. In the example illustrated the exit pupil is expanded in two different dimensions.

In general, 2D exit pupil expanders use diffractive optics. However, a 1D exit pupil expander can use refracting optics, with slanted mirror surfaces (or prisms) inside the light guide 90. 2D expansion with refractive optics is possible but more difficult.

The light guide 90 could comprise a stack of multiple light guides, or partially overlapping light guides 90, or adjacent light guides 90. The term 'light guide' should be construed accordingly. In some examples, the light guide 90 is a single unitary light guide configured to operate at a narrow band of wavelengths.

Glare or stray light in the examples may be caused by reflections on different surfaces, unwanted diffractions (e.g., of higher order) on the diffraction gratings, or some other comparable causes. Means for reducing such effects could be used. Examples include but are not limited to anti-reflection coatings of different surfaces, and special diffraction grating solutions.

The apparatus 10 can comprise additional optical elements that are not described such as, for example, Fresnel lenses for distorting the image from the light guide 90, additional lenses for compensating the distortion originating from the reflection of the windshield combiner 10.

In the above examples, an exit pupil expander (EPE) head-up display (HUD) can consist of a standard EPE solution based on a PGU projector 80 and a diffractive light guide 90 with incoupler 96A, expander 96B, and outcoupler 96C gratings. Other types of EPE layouts are equally possible.

The displayed virtual image 20_3 can be focused to infinity (using a flat light guide 90), or to a finite distance (using e.g., a spherical light guide 90 or a flat light guide 90 with additional lenses), or have multiple focal planes (using e.g., a stack of spherical light guides 90).

The above-described apparatus 10 can be used as a head-mounted display (HMD) or as a head-up display (HUD). The apparatus can be an exit pupil expander (EPE) head up display, optionally a vehicle head up display.

The above-described apparatus 10 can be comprised in a module, a device, a vehicle or cab for a vehicle.

The light guide 90 comprises in-coupling diffractive means for receiving input light defining the image and out-coupling diffractive means configured to out-couple light defining the image. Optionally a diffraction element provides the out-coupling diffractive means.

The light guide is configured as an exit pupil expander and comprises:

in-coupling diffractive means configured to in-couple one or more input beams of light into the light guide, expanding means configured to expand the one or more input beams of light, and out-coupling diffractive means configured to out-couple the one or more expanded beams of light from the light guide.

In at least some examples, the apparatus 10 comprises:

a first display 60;

a second display 62;

a controller or controllers configured to control the first display 60 to display a reference image composed of a color or colors within a first band 12_1 of wavelengths and configured to control the second display 62 to display the reference image comprising a color or colors within a second band 12_2 of wavelengths, wherein the first band 12_1 of wavelengths and the second band 12_2 of wavelengths are different;

a first optical arrangement configured to project light in the first band 12_1 of wavelengths emitted by the first display 60 to form a first reference image at a first eye 54_1 of a user 50 and to project light in the first band 12_1 of wavelengths emitted by the first display 60 to form a second reference image at a second eye 54_2 of the user 50; and a diffractive lightguide configured to project light in a second band 12_2 of wavelengths emitted by the second display 62 to form a third image 20_3 at the first eye 54_1 of the user 50 and at the second eye 54_2 of the user 50.

The first display 60 and the second display 62 can be stacked, optionally stacked such that the first display 60 is further from the user 50 than the second display 62.

In some examples, the first display 60 comprises a color display screen of a is portable handheld device and a binocular display means configured to project light from the color display screen to form a first image 20_1 at the first eye 54_1 of the user 50 and to project light from the color display to form a second image 20_2 at the second eye 54_2 of the user 50.

Figure 11:
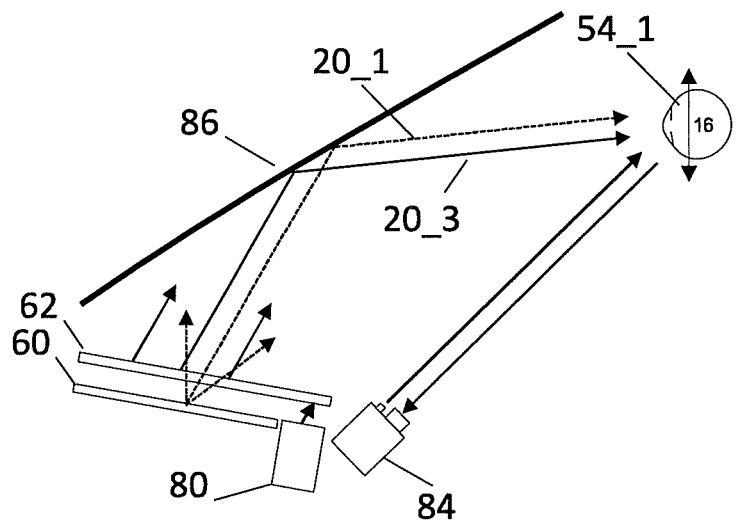
FIG. 11 shows another example of the subject matter described herein.

FIG. 11 illustrates an example as illustrated in FIG. 8. It additionally comprises user tracking means 84. In order to achieve the optimal overlay of the two displayed contents, spatial positions of the eyes 54 of the user 50 or pupils of the eyes 54 can be tracked using an eye pupil position tracker 84, a head tracker, an eye tracker or some other similar tracking solution such as user position measurement means 70 which is illustrated as an optional component in FIG. 1 This can be achieved using computer vision solutions that recognize and track particular features by using solutions that paint a user in an infrared pattern and detect how that pattern is reflected.

While the head of the viewer and therefore the eyes 54 move (e.g., up and/or down or left/right) the first and second images 20_1, 20_2 displayed by the first display means 60 (e.g., the binocular display 61) is adjusted so that the displayed overlay remains matched with the virtual images 20_3 displayed via the second display means 62 (e.g. EPE).

The user eye positions are tracked, and the binocular display images 20_1, 20_2 are adjusted to match with the virtual images 20_3 from the EPE.

Adjustment of the exit pupil position might be needed in order to compensate for individual user size and/or changing head position. The adjustment could be electro-mechanical, for example, tilting the light reflector(s) or the PGU 80 or of some other adjustment type, automatic or manual, and could be synchronized with the HUD position, the seat position, the steering wheel position, or some other adjustment or user identification available in the vehicle.

The apparatus 10 can comprise means for adjusting, in dependence upon the user position 52, at least one of the first image 20_1, second image 20_2 and third image 20_3 to superimpose, in register, the first image 20_1 and the third image 20_3 at the first eye 54_1 of the user 50 and the second image 20_2 and the third image 20_3 at the second eye 54_2 of the user 50.

In at least some examples, the means for adjusting is configured to adjust, in dependence upon the user position 52, at least one of the first image 20_1, second image 20_2 and third image 20_3 to superimpose, in register, the first image 20_1 and the third image 20_3 at the first eye 54_1 of the user 50 and the second image 20_2 and the third image 20_3 at the second eye 54_2 of the user 50 to create a fourth image 20_4 at the first eye 54_1 and at the second eye 54_2.

The adjustment, in dependence upon the user position 52, can be of the first image 20_1 and/or second image 20_2 but not the third image 20_3.

The adjustment can be such that the first image 20_1 and the third image 20_3 is in register overlay or are substantially in register overlay in an image observable by the user 50 at the first eye 54_1. The adjustment can be such that the second image 20_2 and the third image 20_3 is in register overlay or are substantially in register overlay in an image observable by the user 50 at the second eye 54_2.

The adjustment, in dependence upon the user position 52, of at least one of the first image 20_1, second image 20_2 and third image 20_3 can be achieved by performing one or more of: a relative lateral shift 32, a rescale 34.

The apparatus 10 can, for example, can comprise display adjustment means for adjusting a projection direction of the first display 60 means and/or the second display 62 means. A parallax barrier or lenticular lens structures on top of the display panel of the first display means 60 could be laterally shifted.

The above-described solutions can be used in augmented reality (AR) headsets and avionic and automotive head up display (HUD) systems. Automotive EPE HUD requires large light guides, possibly 400 mm wide or wider. Manufacturing of such large light guides is costly and it is highly desirable to include only one light guide to produce the full RGB color gamut, instead of two or more light guides in a typical stacked EPE structure. The problem with having only one light guide however is related to the design optimization. It becomes very challenging to achieve high efficiency and uniformity for a wide wavelength band. Typically, diffraction grating optimization can only be done for a certain wavelength, not for the full RGB spectrum. The solutions described enable the use of less light guides (for example only one EPE) to produce the full color gamut. In FIGs. 12A 12B, 13A, 13B, the first display means 60 projects light 82_1 in a first band 12_1 of wavelengths to form a first image 20_1 at a first eye 54_1 of a user 50 and projects light 82_2 in the first band 12_1 of wavelengths to form a second image 20_2 at a second eye 54_2 of the user 50 and the second display means 62 projects light 82_3 in a second band 12_2 of wavelengths to form a third image 20_3 at the first eye 54_1 of the user 50 and at the second eye 54_2 of the user 50.

Figure 12A:
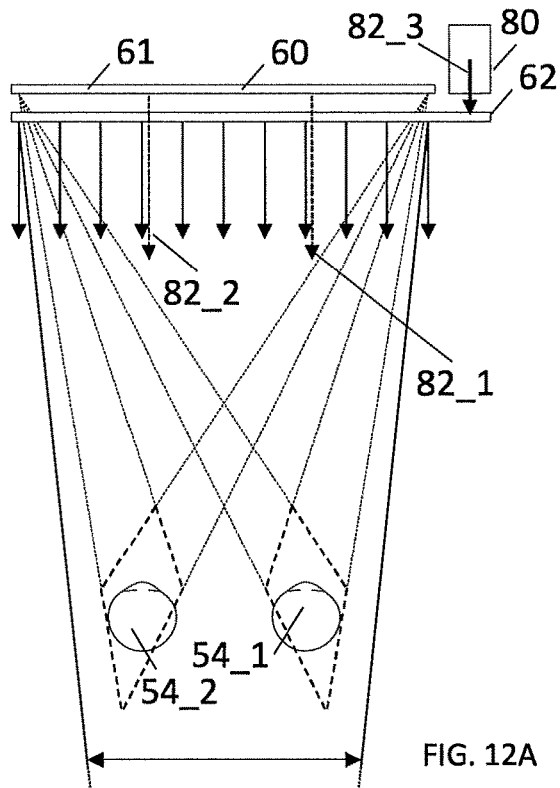
FIG. 12A, 12B shows another example of the subject matter described herein.
Figure 12B:
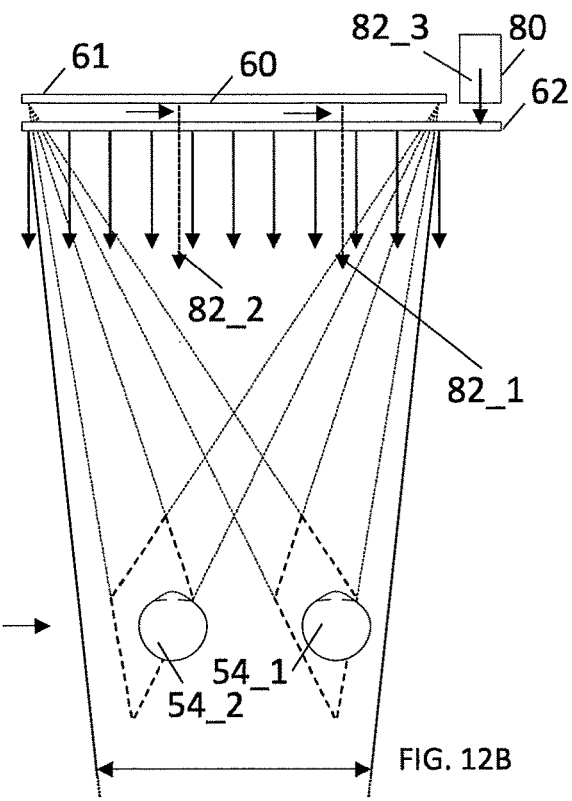

FIGs. 12A and 12B illustrate an example where the first display means 60 is a two-view binocular display 61 and the user changes head position by moving to the right.

Figure 13A:
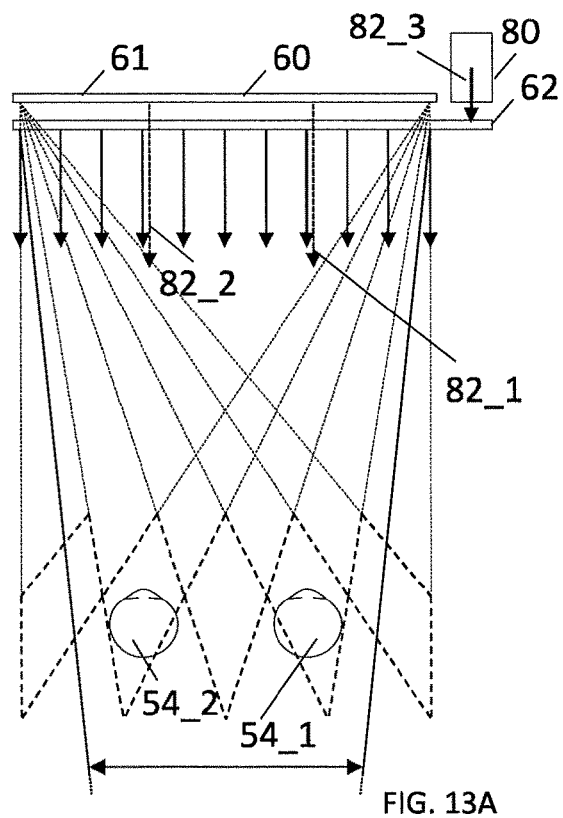
FIG. 13A, 13B show other examples of the subject matter described herein.
Figure 13B:
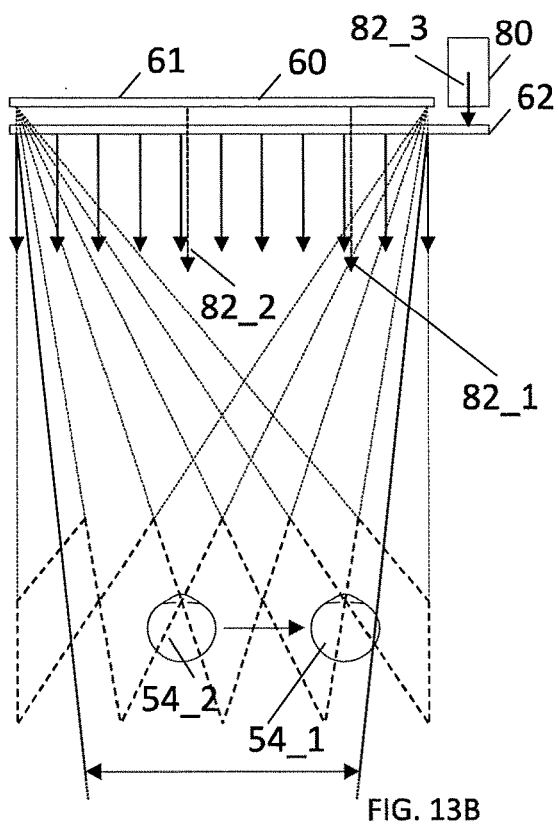

FIGs. 13A and 13B illustrate an example where the first display means 60 is a multi-view binocular display 61 and the user changes head position by moving to the right.

In FIGS. 12A and 12B, there are separate viewing diamonds for the right and the left eyes 54-1, 54_2. While the eyes stay inside these viewing diamonds, separate images 20_1, 20_2 can be displayed to the respective eyes 54_1, 54_2.

The target is not to create an illusion of stereoscopic images. Rather, the images 20-1, 20_2 are such, that each eye will have a matching overlay with the virtual image 20_3. The virtual image 20_3 has a limited color gamut, due to missing blue (as an example) color component. The light from the binocular display 61 adds the missing color component, resulting in full RGB color rendering.

In FIG. 12B, the user head position has moved to the right compared to FIG. 12A. There has been a corresponding shift in the first image 20_1 (the light 82_1) and the second image 20_2 (the light 82_2) so that they remain aligned with the first eye 54_1 and second eye 54_2 respectively.

Even though the eyes 54_1, 54_2 are still inside the viewing diamonds, this new state may result in a situation where the two contents are offset and the observed resolution of the combined image is reduced. The proposed solution is to reduce the offset by shifting the first and second images 20_1, 20_2 to the same direction by the same amount.

As an additional and optional technical functionality, a shift of the viewing diamonds can be achieved by moving the parallax barrier or lenticular lens structures on top of the display panel of the first display means 60. This makes sure the eyes 54_1, 54_2 remain inside the views 21.

In FIG. 13A, a multi-view binocular display 61, as illustrated, can support larger viewing freedom with static display structures.

There are separate viewing diamonds for the right and the left eyes 54-1, 54_2. While the eyes stay inside these viewing diamonds, separate images 20_1, 20_2 can be displayed to the respective eyes 54_1, 54_2.

The target is not to create an illusion of stereoscopic images. Rather, the images 20-1, 20_2 are such, that each eye will have a matching overlay with the virtual image 20_3. The virtual image 20_3 has a limited color gamut, due to missing blue (as an example) color component. The light from the binocular display 61 adds the missing color component, resulting in full RGB color rendering.

In FIG. 13B, the user head position has moved to the right. There has been a corresponding shift in the first image 20_1 (the light 82_1) and the second image 20_2 (the light 82_2) so that they remain aligned with the first eye 54_1 and second eye 54_2 respectively.

Figure 14A:
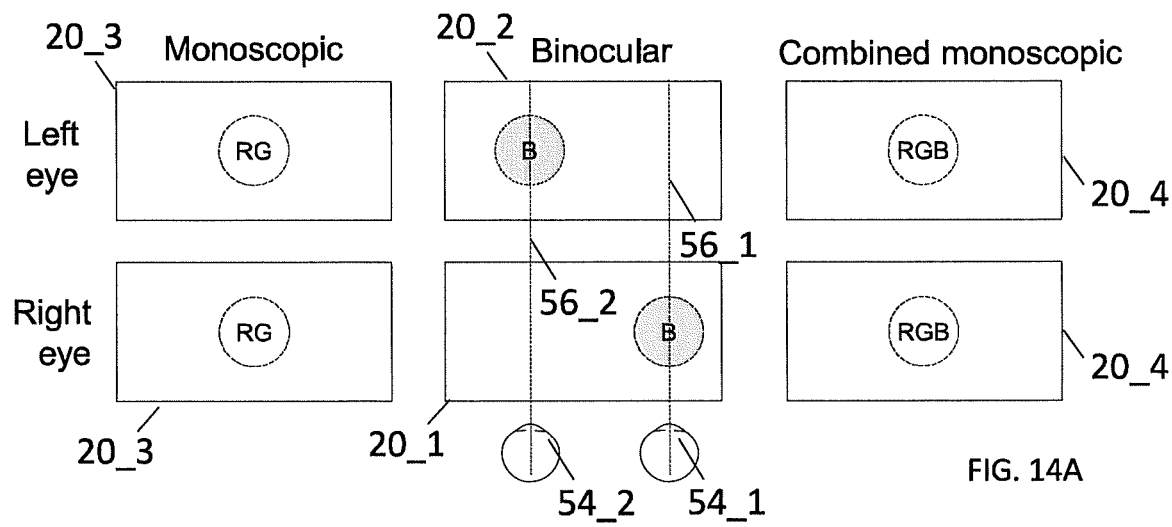
FIG. 14A, 14B, 14C show other examples of the subject matter described herein.
Figure 14B:
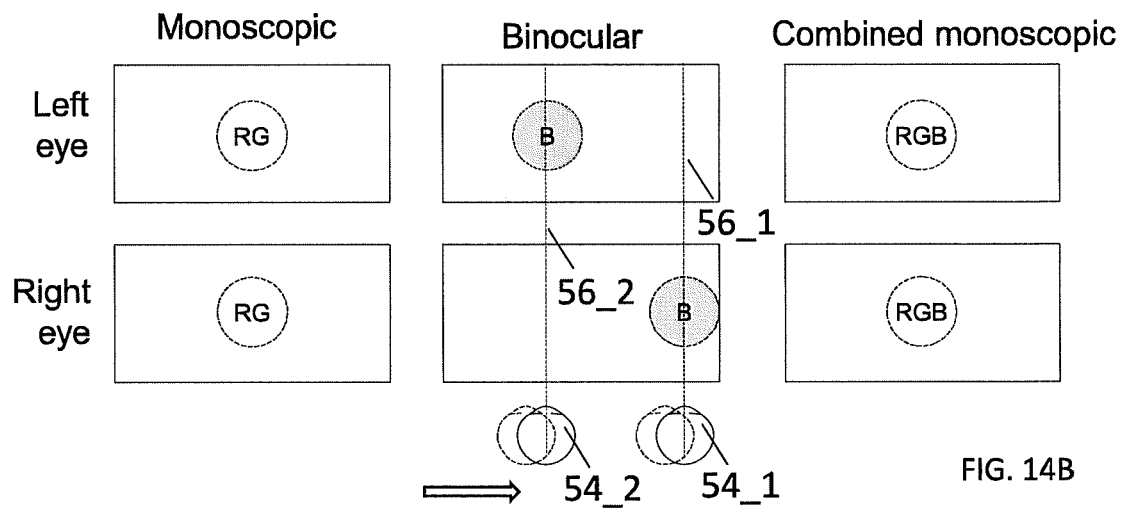
Figure 14C:
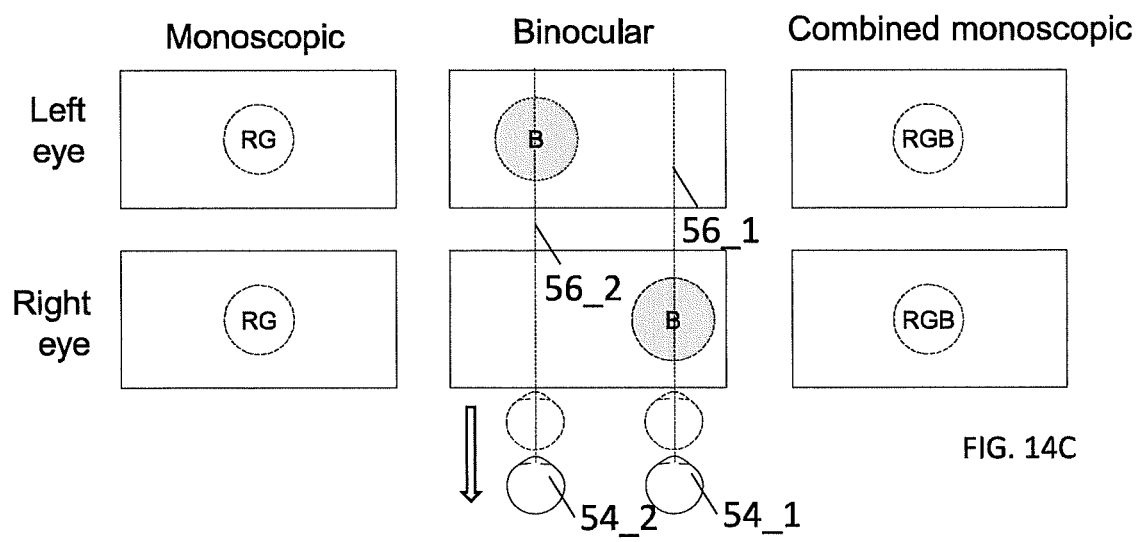

FIG. 14A, 14B, 14C illustrate the impact of lateral shifting and re-sizing on the first and second images 20_1, 20_2.

In each FIG, the third image 20_3 provided to the right eye 54_1 and to the left eye 54_2 are illustrated. These are the same in each FIG. The reduced gamut of the third image is illustrated by 'RG'. The image comprises Green and Red but does not comprise Blue.

In each FIG, the first image 20_1 provided to the right eye 54_1 and the second image 20_2 provided to the left eye 54_2 are illustrated. The reduced gamut of the first and second images 20_1, 20_2 is illustrated by 'B'. The image comprises Blue but does not comprise Green and Red.

In each FIG, the composite fourth image 20_4 provided to the right eye 54_1 and to the left eye 54_2 are illustrated. The full gamut of the fourth image 20_4 is illustrated by 'RGB'. The image comprises Red, Green and Blue because it comprises the superposition of the first image 20_1 and the third image 20_3 at the first eye 54_1 and the superposition of the second image 20_2 and the third image 20_3 at the second eye 54_2.

Comparing FIG. 14B to FIG. 14A, the eyes of the user have shifted to the right in FIG. 14B. The first image 20_1 aligned with the first eye 54_1 and the second image 20_2 aligned with the second eye 54_2 in FIG. 14A are shifted to the right so that they stay aligned with their respective eyes. This retains registration between the first image 20_1 and the third image 20_3 in the composite image 20_4 at the first eye 54_1 and retains registration between the second image 20_2 and the third image 20_3 in the composite image 20_4 at the second eye 54_2. The final observed/combined image 20_4 is the same despite the different eye positions.

Comparing FIG. 14C to FIG. 14B, the eyes of the user have moved further way in FIG. 14C. The first image 20_1 aligned with the first eye 54_1 and the second image 20_2 aligned with the second eye 54_2 in FIG. 14A are enlarged so that they appear to be eye positions correctly sized in comparison to the third image 20_3 which is focused at infinity. This retains registration between the first image 20_1 and the third image 20_3 in the composite image 20_4 at the first eye 54_1 and retains registration between the second image 20_2 and the third image 20_3 in the composite image 20_4 at the second eye 54_2. The final observed/combined image 20_4 is the same despite the different eye positions.

In these examples, the first display 60 and the second display 62 are both kept on the visual axes 56_1, 56_2 of the eyes 54_1, 54_2.

On the second display 62, there is only one image 20_3 at infinity (visual axes 56 of the eyes are parallel) or somewhere far (slightly converging axes).

The matching images 20_1, 20_2 for the right and left eyes 54_1, 54_2 on the first display 60 is set to align with those visual axes 56, separately for both eyes.

The measurement of eye locations in 3D space is performed. Technical solutions may be based e.g., on stereo camera pair tracking the user 50 head/eyes.

Registration/calibration of the first and the second display 62 may be manually done by a technician, or be fully automated.

For the adjustment of scaling, the distance of the eyes from the display arrangement/HUD can be measured with the same 3D tracking solution. The relationship between the distance of the eyes and the size of the image on the first display 60 can be calculated from the viewing geometry.

The invention is equally suitable with different HUD configurations or technologies, where e.g., additional lenses are used for compensating the distortion originating from the reflection of the windshield, or a separate combiner is used, or a curved EPE light guide is used.

In all the above examples, EPE HUD can consist of a standard EPE solution based on a PGU projector and a diffractive light guide with incoupler, expander, and outcoupler gratings. Other types of EPE layouts are equally possible. The displayed virtual image can be focused to infinity (using a flat EPE), or to a finite distance (using e.g., a spherical EPE or a flat EPE+additional lenses), or have multiple focal planes (using e.g., a stack of spherical EPEs).

Only one EPE plate is shown in all the examples and it should be enough for achieving full colors, decent exit pupil/eyebox size, and eye relief/viewing distance from the EPE HUD system. Nonetheless, the invention is also compatible with solutions where multiple EPE plates are required for multiplexing the colors, the focal distance, the FOV, the exit pupil, or some other features.

FIG. 15 illustrates an example of a method 500 for projecting images 20 towards a user 50.

At block 502, the method 500 comprises projecting light in a first band 12_1 of wavelengths to form a first image 20_1 at a first eye 54_1 of a user 50.

At block 504, the method 500 comprises projecting light in the first band 12_1 of wavelengths to form a second image 20_2 at a second eye 54_2 of the user 50.

At block 506, the method comprises projecting light in a second band 12_2 of wavelengths to form a third image 20_3 at the first eye 54_1 of the user 50 and at the second eye 54_2 of the user 50, wherein the first band 12_1 of wavelengths and the second band 12_2 of wavelengths is different.

The blocks 502, 504, 506 can occur in parallel. The blocks 502, 504, 506 can occur in simultaneously.

FIG. 16 illustrates an example of a controller 400 suitable for use in an apparatus 10. Implementation of a controller 400 may be as controller circuitry. The controller 400 may be implemented in hardware alone, have certain aspects in software including firmware alone or can be a combination of hardware and software (including firmware).

As illustrated in FIG. 16 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 10 when loaded into the processor 402. The computer program instructions, of the computer program 406, provide the logic and routines that enables the apparatus to perform the methods illustrated in the accompanying Figs. The processor 402 by reading the memory 404 is able to load and execute the computer program 406.

The apparatus 10 comprises:
at least one processor 402; and
at least one memory 404 including computer program code
the at least one memory 404 and the computer program code configured to, with the at least one processor 402, cause the apparatus 10 at least to perform:
projecting light in a first band of wavelengths to form a first image at a first eye of a user;
projecting light in the first band of wavelengths to form a second image at a second eye of the user;
projecting light in a second band of wavelengths to form a third image at the first eye of the user and at the second eye of the user,
wherein the first band of wavelengths and the second band of wavelengths are different.

The apparatus 10 comprises:
at least one processor 402; and
at least one memory 404 including computer program code,
the at least one memory storing instructions that, when executed by the at least one processor 402, cause the apparatus at least to:
projecting light in a first band of wavelengths to form a first image at a first eye of a user;
projecting light in the first band of wavelengths to form a second image at a second eye of the user;
projecting light in a second band of wavelengths to form a third image at the first eye of the user and at the second eye of the user,
wherein the first band of wavelengths and the second band of wavelengths are different.

As illustrated in FIG. 17, the computer program 406 may arrive at the apparatus 10 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 10 may propagate or transmit the computer program 406 as a computer data signal.

Computer program instructions for causing an apparatus to perform at least the following or for performing at least the following:
controlling projecting light in a first band of wavelengths to form a first image at a first eye of a user;
controlling projecting light in the first band of wavelengths to form a second image at a second eye of the user;
controlling projecting light in a second band of wavelengths to form a third image at the first eye of the user and at the second eye of the user, wherein the first band of wavelengths and the second band of wavelengths are different.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable.

The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory or memories that work together to cause an apparatus, such as a mobile phone or server, to perform various functions and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying Figs may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The apparatus 10 can be a module. It can also be a system.

The above-described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning.

That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   a first display for projecting light in a first band of wavelengths to form a first image at a first eye of a user and for projecting light in the first band of wavelengths to form a second image at a second eye of the user;
   a second display for projecting light in a second band of wavelengths to form a third image at the first eye of the user and at the second eye of the user;
   wherein the first band of wavelengths and the second band of wavelengths are different;
   wherein the first image is a partial image created from a reference image and is colored in the first band of wavelengths and the third image is a partial image and created from the reference image and is colored in the second band of wavelengths at the first eye, and
   wherein the second image is a partial image and created from the reference image and is colored in the first band of wavelengths and the third image is a partial image and created from the reference image and is colored in the second band of wavelengths at the second eye; and
   wherein the first display and the second display are aligned in a stack and in close proximity such that the first display is further from the user than the second display.

2. An apparatus as claimed in claim 1, wherein the first display and the second display are configured to superpose the first image and the third image, in register, at the first eye of the user and to superpose the second image and the third image, in register, at the second eye of the user.

3. An apparatus as claimed in claim 1, wherein the first display and the second display are configured to superpose the first image and the third image, in register, at the first eye of the user to create a fourth image at the first eye and to superpose the second image and the third image, in register, at the second eye of the user to create the fourth image at the second eye.

4. An apparatus as claimed in claim 1, comprising:
   at least one processor; and
   at least one non-transitory memory storing instructions that, when executed with the at least one processor, cause the apparatus to perform:
      obtaining a user position; and
      adjusting, in dependence upon the user position, at least one of the first image, second image and third image to superimpose, in register, the first image and the third image at the first eye of the user and the second image and the third image at the second eye of the user.

5. An apparatus as claimed in claim 4, wherein the instructions, when executed with the at least one processor, are configured to adjust, in dependence upon the user position, at least one of the first image, second image and third image to superimpose, in register, the first image and the third image at the first eye of the user and the second image and the third image at the second eye of the user to create a fourth image at the first eye and at the second eye.

6. An apparatus as claimed in claim 5, wherein the instructions, when executed with the at least one processor, are configured to adjust, in dependence upon the user position, at least one of the first image, second image and third image by performing one or more of: a relative lateral shift, a rescale.

7. An apparatus as claimed in claim 1, comprising:
   at least one processor; and
   at least one non-transitory memory storing instructions that, when executed with the at least one processor, cause the apparatus to perform:
      determining a user position, optionally for determining user eye positions or eye pupil positions.

8. An apparatus as claimed in claim 1, wherein the first display is configured for simultaneous projection of light in a first band of wavelengths to form the first image at the first eye of a user and of light in the first band of wavelengths to form the second image at the second eye of the user.

9. An apparatus as claimed in claim 1, wherein the second display comprises one or more exit pupil expanders.

10. An apparatus as claimed in claim 1, comprising a display adjustment for adjusting a projection direction of the first display and/or the second display.

11. An apparatus as claimed in claim 1 wherein the first display and the second display are configured such that the first wavelength band and the second band are non-overlapping, and optionally the first band of wavelengths is a lower wavelength than the second band of wavelengths.

12. An apparatus as claimed in claim 1 configured as an exit pupil expander head up display, optionally a vehicle head up display.

13. An apparatus as claimed in claim 1, comprising as the first display a portable handheld device comprising a color display screen and a binocular display configured to project light from the color display screen to form a first image at the first eye of the user and to project light from the color display to form a second image at the second eye of the user.

14. A method comprising:
- projecting light in a first band of wavelengths to form a first image at a first eye of a user;
- projecting light in the first band of wavelengths to form a second image at a second eye of the user;
- projecting light in a second band of wavelengths to form a third image at the first eye of the user and at the second eye of the user;
- wherein the first band of wavelengths and the second band of wavelengths are different;
- wherein the first image is a partial image created from a reference image and is colored in the first band of wavelengths and the third image is a partial image and created from the reference image and is colored in the second band of wavelengths at the first eye, and wherein the second image is a partial image and created from the reference image and is colored in the first band of wavelengths and the third image is a partial image and created from the reference image and is colored in the second band of wavelengths at the second eye; and
- wherein the light projected in the first band of wavelengths is projected from a first display behind a second display from which the light projected in the second band of wavelengths is projected, and wherein the first display and the second display are aligned in a stack and in close proximity such that the first display is further from the user than the second display.

15. A non-transitory program storage device readable with an apparatus, tangibly embodying a program of instructions that, when executed with the apparatus, cause the apparatus to perform at least the following:
- projecting light in a first band of wavelengths to form a first image at a first eye of a user;
- projecting light in the first band of wavelengths to form a second image at a second eye of the user;
- projecting light in a second band of wavelengths to form a third image at the first eye of the user and at the second eye of the user;
- wherein the first band of wavelengths and the second band of wavelengths are different;
- wherein the first image is a partial image created from a reference image and is colored in the first band of wavelengths and the third image is a partial image and created from the reference image and is colored in the second band of wavelengths at the first eye, and wherein the second image is a partial image and created from the reference image and is colored in the first band of wavelengths and the third image is a partial image and created from the reference image and is colored in the second band of wavelengths at the second eye; and
- wherein the light projected in the first band of wavelengths is projected from a first display behind a second display from which the light projected in the second band of wavelengths is projected, and wherein the first display and the second display are aligned in a stack and in close proximity such that the first display is further from the user than the second display.

* * * * *